(12) United States Patent
Armstrong et al.

(10) Patent No.: US 8,597,020 B2
(45) Date of Patent: Dec. 3, 2013

(54) METHOD AND APPARATUS FOR DELIVERING SEQUENTIAL SHOTS TO MULTIPLE CAVITIES TO FORM MULTILAYER ARTICLES

(75) Inventors: Ralph Armstrong, Weston, CT (US); Thomas E. Nahill, Amherst, NH (US)

(73) Assignee: Graham Packaging Company, LP, York, PA (US)

( * ) Notice: Subject to any disclaimer, the term of this patent is extended or adjusted under 35 U.S.C. 154(b) by 0 days.

(21) Appl. No.: 13/233,144

(22) Filed: Sep. 15, 2011

(65) Prior Publication Data

US 2012/0003343 A1    Jan. 5, 2012

Related U.S. Application Data

(60) Division of application No. 12/699,953, filed on Feb. 4, 2010, now Pat. No. 8,021,587, which is a continuation of application No. 11/539,410, filed on Oct. 6, 2006, now abandoned.

(51) Int. Cl.
 *B29C 45/16*   (2006.01)
(52) U.S. Cl.
 USPC ........... 425/572; 425/130; 425/148; 425/573; 425/558; 425/588; 264/241; 264/250; 264/255; 264/297.2; 264/328.8
(58) Field of Classification Search
 CPC  B29C 45/16; B29C 45/1643; B29C 45/1646; B29C 45/02; B29B 2911/14126
 USPC ......... 425/130, 533, 562, 564, 572, 573, 145, 425/148, 557, 588; 264/45.1, 241, 250, 264/255, 297.2, 328.12, 328.8, 513
 See application file for complete search history.

(56) References Cited

U.S. PATENT DOCUMENTS

| 3,793,415 | A | 2/1974 | Smith |
| 3,894,823 | A | 7/1975 | Hanning |

(Continued)

FOREIGN PATENT DOCUMENTS

| EP | 0291640 A2 | 2/1988 |
| EP | 0377497 A1 | 1/1990 |

(Continued)

OTHER PUBLICATIONS

Nov. 2, 2011 JPO Office Action.

(Continued)

*Primary Examiner* — Seyed Masoud Malekzadeh
(74) *Attorney, Agent, or Firm* — Novak Druce Connolly Bove + Quigg LLP

(57) ABSTRACT

Method and apparatus for sequentially delivering multiple shots of polymer material to a plurality of mold cavities to form multilayer articles. A first shot of greater than 50% of the total article weight of a first polymer material is simultaneously delivered to a plurality of mold cavities using, at each cavity, a chamber of predetermined volume that is prefilled with the first polymer material. A second shot of no greater than 10% of the total article weight of a second material is simultaneously delivered to all of the cavities beginning subsequent to the step of delivering the start of the first shot delivery step. The second shot of second material is delivered through a manifold channel that fluidly communicates with each cavity, and is injected to all cavities under pressure exerted by a source of the second material that is common to all of the plurality of cavities.

16 Claims, 13 Drawing Sheets

(56) References Cited

U.S. PATENT DOCUMENTS

| | | |
|---|---|---|
| 3,947,175 A | 3/1976 | Melcher |
| 4,078,875 A | 3/1978 | Eckardt |
| 4,717,324 A | 1/1988 | Schad et al. |
| 4,808,101 A | 2/1989 | Schad et al. |
| 4,863,665 A | 9/1989 | Schad et al. |
| 5,028,226 A | 7/1991 | De'ath et al. |
| 5,030,077 A | 7/1991 | Orimoto et al. |
| 5,131,830 A | 7/1992 | Orimoto et al. |
| 5,143,733 A | 9/1992 | Von Buren et al. |
| 5,192,555 A | 3/1993 | Arnott |
| 5,223,275 A | 6/1993 | Gellert |
| 5,232,710 A * | 8/1993 | Miyazawa et al. ............ 425/130 |
| 5,260,012 A | 11/1993 | Arnott |
| 5,662,856 A | 9/1997 | Wunderlich |
| 5,897,822 A | 4/1999 | van Manen et al. |
| 5,922,363 A | 7/1999 | Beck et al. |
| 5,971,735 A | 10/1999 | Beck et al. |
| 6,129,536 A * | 10/2000 | Beck et al. .................... 425/130 |
| 6,146,123 A * | 11/2000 | Lausenhammer et al. .... 425/130 |
| 6,276,914 B1 * | 8/2001 | Sicilia ........................ 425/131.1 |
| 6,276,916 B1 * | 8/2001 | Schad et al. .................. 425/136 |
| 6,382,946 B1 * | 5/2002 | Beck et al. .................... 425/130 |
| 6,491,509 B1 * | 12/2002 | Schad et al. .................. 425/130 |
| 7,399,442 B2 * | 7/2008 | Sabin et al. ................. 264/328.8 |
| 2004/0109916 A1 | 6/2004 | Babin |
| 2006/0029691 A1 | 2/2006 | Sabin et al. |

FOREIGN PATENT DOCUMENTS

| | | |
|---|---|---|
| JP | 63-309417 | 5/1988 |
| JP | 4-83628 | 7/1990 |

OTHER PUBLICATIONS

The International Search Report and Written Opinion in PCT/US2007/080524 mailed Aug. 4, 2008.

* cited by examiner

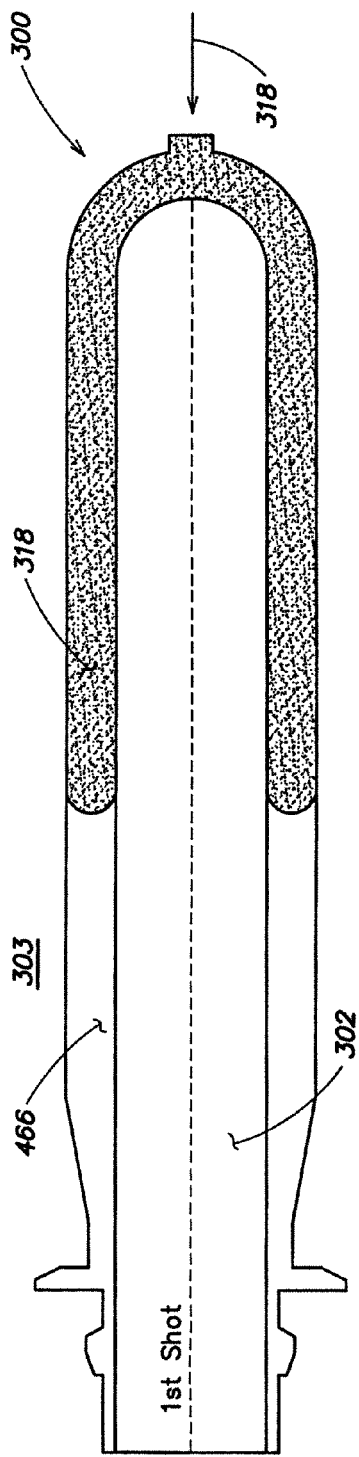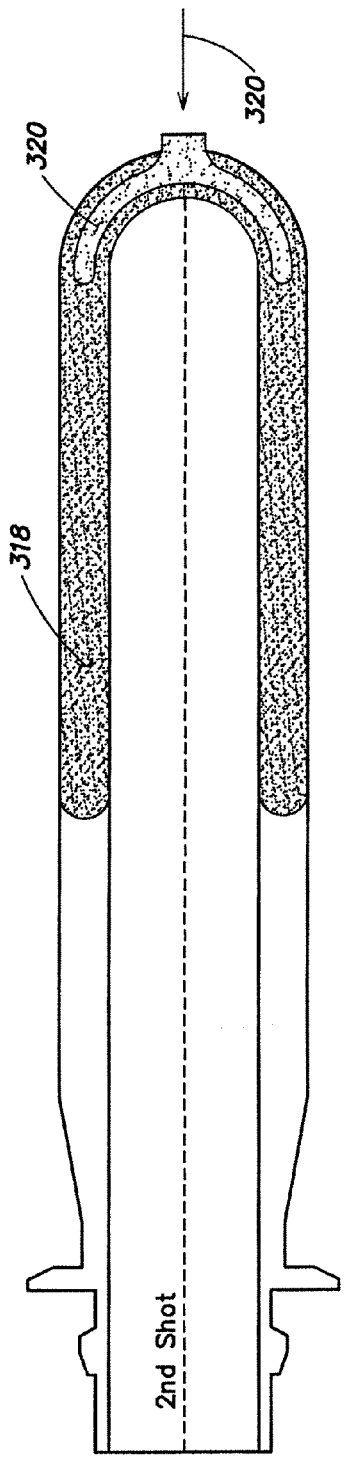
FIG. 4A
FIG. 4B

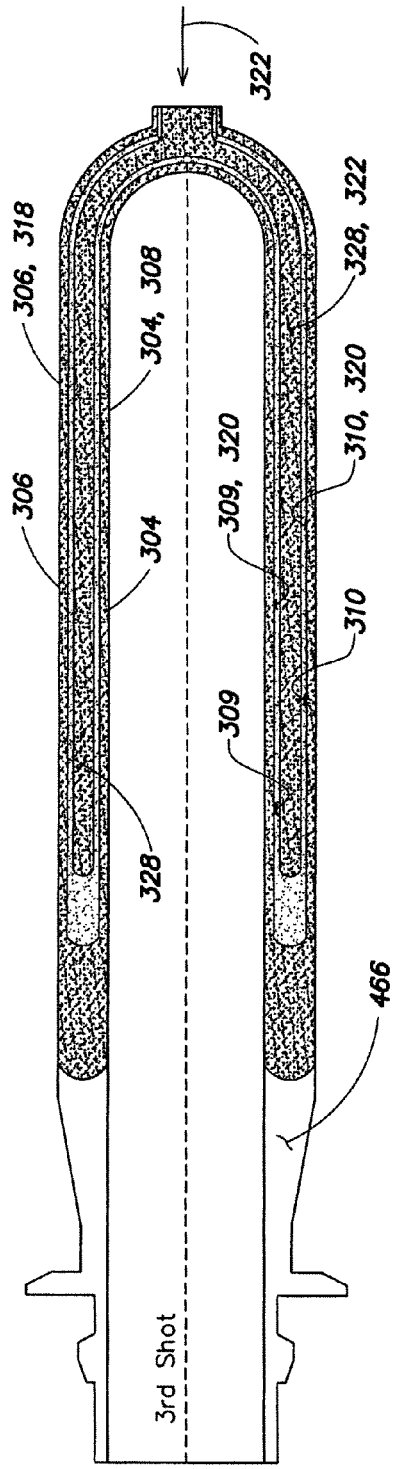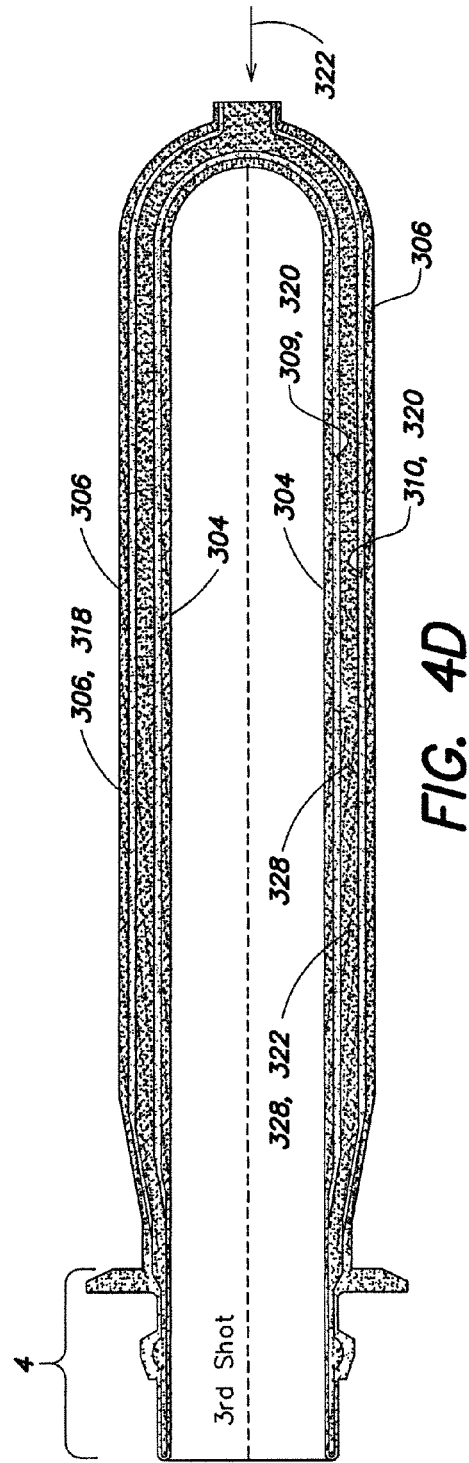

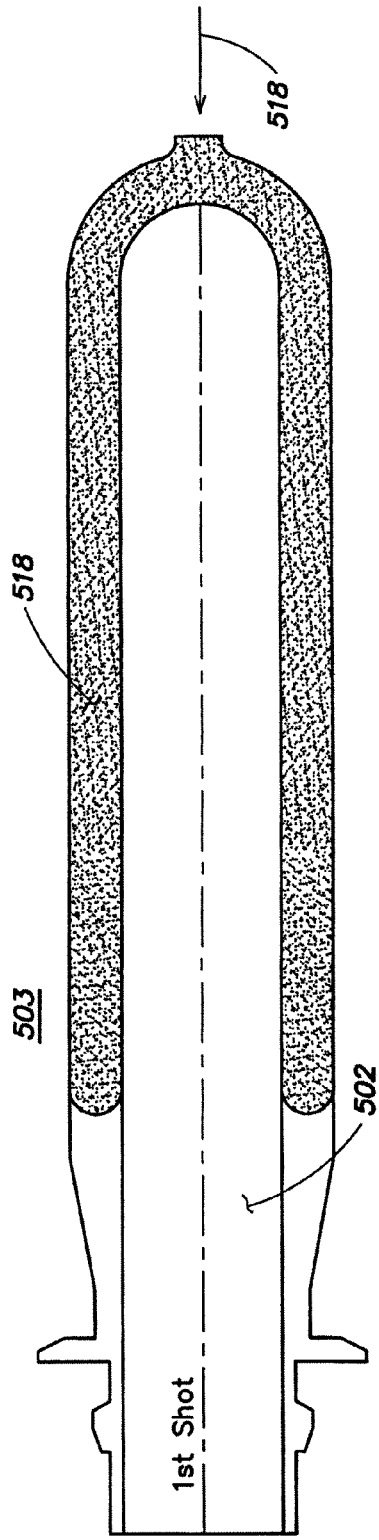
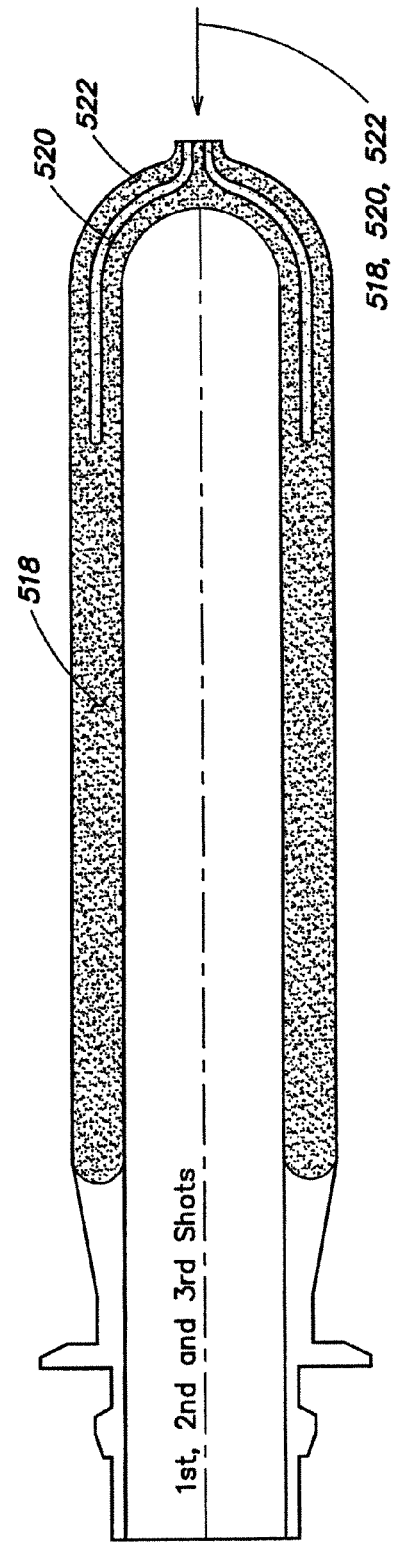
FIG. 8A
FIG. 8B

METHOD AND APPARATUS FOR DELIVERING SEQUENTIAL SHOTS TO MULTIPLE CAVITIES TO FORM MULTILAYER ARTICLES

FIELD OF THE INVENTION

The present invention relates to the delivery of sequential shots of polymer material to multiple mold cavities to form multilayer articles, and more specifically to forming multilayer preforms having interior layer(s) of relatively low weight percentage and substantially uniform height (across multiple cavities).

BACKGROUND OF THE INVENTION

Sequential injection molding processes for performing sequential shots of different polymer materials are well known. To accomplish such processes, various apparati have been developed using hotrunner systems that are designed to deliver sequential shots of polymer material to a plurality of cavities. In multicavity applications, shots are intended to be delivered at the same time in the same amounts and at the same rates of flow by controlling the length and configuration of the hotrunner flow channels and the temperature of various portions of the hotrunner and injection nozzles to each cavity. However, in practice, it is very difficult to achieve such uniform delivery to multiple cavities.

When a single source of polymer material is used to effect flow through all channel paths in a hotrunner to multiple mold cavities, the pressure will vary between the flow paths even at points within different channels that are located the same distance (path length) from the source of injection. Still further, changes in the polymer material(s) over time, e.g., different batches, sources, temperatures and moisture content, can alter the flow characteristics of the material and render the system unbalanced.

These types of multi-cavity injection molding systems are in widespread use in the food and beverage industry to make multilayer preforms, which are subsequently blow molded into multilayer containers. In particular, these multilayer preform and container structures enable cost effective use of what are generally more expensive barrier and/or high thermal performance materials, as one or more layers of the preform. Ideally, the amounts of the expensive barrier or high performance polymer materials are utilized in relatively thin layers, thus reducing the overall cost of the preform/container, while a less expensive structural polymer comprises the predominant weight percentage of the article.

For example, Continental PET Technologies (CPT) developed a sequential multilayer injection process for making three-layer or five-layer preforms. A typical five-layer preform includes inner and outer exterior layers of virgin PET, a central core layer of virgin or recycled (e.g., post consumer and/or plant scrap) PET, and two thin intermediate barrier layers between each of the core and exterior layers. A relatively small amount of barrier material, typically 2 to 5 percent of the total preform weight, forms the thin intermediate layers and yet provides effective barrier (e.g., gas, moisture, flavor) performance. In order to provide a uniform and consistent barrier layer structure, the CPT process utilizes devices, commonly referred to as mold shooting (or metering) pots, which comprise a chamber of predefined volume that is filled/prefilled with the polymer material and located adjacent to an associated cavity. This enables injection of a precise amount of virgin PET (greater than 50% of the total preform weight) from a first shooting pot during a first shot injection, followed by a precise amount of barrier material (2-5% of the total preform weight) from a second shooting pot during a second shot injection. A third shot of virgin or post-consumer PET is injected from a machine shooting pot (the first, second and third shots comprising approximately 95% of the total preform weight). A fourth and final shot of virgin PET is then injected from a machine shooting pot to pack the preform, and clean out the post-consumer PET from the nozzle in preparation for the next cycle. The CPT process and multilayer articles are described in one or more of U.S. Pat. Nos. 4,550,043; 4,609,516; 4,710,118; 4,781,954; 4,950,143; 4,990,301; 4,923,723; and 5,098,274, the disclosures of all of which are incorporated herein by reference as if fully set forth herein.

The use of mold shooting pots is an effective way to provide precise amounts of polymer material for the various layers and insure consistent preform layer structure. However, there is a cost associated with utilizing shooting pots in multicavity systems, namely the associated cost of providing a shooting pot for each material for each mold cavity and the expense in providing sufficient physical space in the machine platen to accommodate all of these shooting pots. As a result of the increased demand for platen space, the preform manufacturer is generally required to purchase a larger more expensive, higher tonnage machine, even though the increased tonnage is not required. Also, when multiple shots of polymer material are affected using metering pots, the sequence and timing of the shots becomes cumbersome and more time-consuming in having to complete all shots of all polymer materials from multiple metering pots mounted in multiple locations on a hotrunner/manifold.

For these reasons, others have attempted to rely on balanced manifolds for delivering each of the multiple layer materials. However, while avoiding the cost and space constraints of shooting pots, these systems do not consistently produce uniform layer structures in the preform.

It would thus be desirable to provide alternative injection molding systems for forming multilayer articles in multiple cavities, particularly in the manufacture of multilayer preforms utilizing relatively low weight percentages of select (e.g., barrier layer) materials but requiring formation of a consistent layer structure across multiple cavities.

SUMMARY OF THE INVENTION

In accordance with the present invention, a new method and apparatus are provided for delivering sequential shots of polymer materials to multiple mold cavities to form multilayer articles. It has been found that selective use of shooting pots can produce multilayer structures with substantially different weight percentages of layer materials but a relatively uniform layer structure, across multiple cavities.

In one embodiment, a method and apparatus are provided for forming a five-layer preform having two relatively thin intermediate interior layers, comprising no greater than 10% of the total article weight, which method/apparatus does not require the use of shooting pots for delivering this low weight percentage interior layer material. A separate mold shooting pot (for each cavity) is used to deliver a much greater amount, greater than 50% of the total article weight, of a first shot which forms the exterior inner and outer layers of the article. In contrast, the low weight percentage second shot can be delivered to all cavities from a common source. The remaining relatively large volume(s) of polymer material(s) can be delivered from one or more sources.

Thus, contrary to what was previously deemed a required use of shooting pots to deliver consistent amounts of a relatively low weight percentage of barrier material for the thin intermediate layers (i.e., in order to insure that the barrier material layer(s) extended along a predetermined length of the preform and/or were of a predetermined thickness to provide the required barrier performance), it has now been found that one can rely upon delivery of the barrier material from a common source of injection material (common to multiple mold cavities). While there will be variations in the amount of barrier material delivered, the faster injection (lower injection time due to lower volume of material) of the second shot, and the controlled amount of the relatively large volume first shot, produces a substantially uniform height of the second shot interior layer(s). This finding is counterintuitive to prior expectations that even a minor variation in the amount of a relatively small shot, would produce a greater variation in layer structure (because the variation comprises a larger percentage of a smaller volume).

In accordance with one embodiment, there is provided a method of sequentially delivering multiple shots of polymer material to a plurality of mold cavities to form multilayer articles, the method comprising:

delivering a first shot, for forming an exterior article layer of a predetermined volume of greater than 50% of the total article weight of a first polymer material, simultaneously to a plurality of mold cavities using, at each cavity, a chamber that is pre-filled with the first polymer material to deliver the predetermined volume of the first material separately to each mold cavity;

delivering a second shot comprising up to 10% of the total article weight of a second material, simultaneously to all of the cavities beginning subsequent to the start of the first shot delivery step; and delivering one or more additional shots of material to form the multilayer article;

wherein the second shot delivery step comprises injecting the second shot of the second material through a manifold channel that fluidly communicates with each cavity, the second shot being injected to all cavities under pressure exerted by a source of the second material that is common to all of the plurality of cavities.

A third shot may be delivered through a manifold channel that fluidly communicates with each cavity, the third shot being injected under pressure exerted by a source of a third material that is common to all of the plurality of cavities.

The second shot delivery step may begin upon completion of delivery of the first shot to all of the plurality of cavities. Similarly, the third shot may begin following completion of delivery of the second shot to all cavities.

In various embodiments, the weight of the second shot of material is: no more than about 10%, no more than about 8%, or no more than about 5%, of the total article weight.

The first shot delivery step may deliver a structural polymer material as the first polymer material, while the second shot delivers a barrier (or other high performance) polymer material as the second polymer material. The third shot may comprise a structural and/or recycled material as the third polymer material.

In accordance with one method embodiment, the second shot delivery step begins prior to completion of the first shot delivery. Furthermore, a third shot delivery step may begin with or after start of the second delivery step and prior to completion of the first delivery step. The second shot may deliver a barrier polymer material, and the first and third shots deliver the same or different structural polymer materials.

In accordance with another embodiment of the invention, an injection molding apparatus is provided comprising:

a plurality of mold cavities, each cavity fluidly communicating with first, second and third fluid delivery channels that respectively deliver first, second and third shots of first, second and third polymer materials sequentially to each mold cavity;

the first fluid delivery channel having separate channel portions individually fluidly communicating with a separate corresponding cavity, each channel portion having a separate fluid injection chamber that separately communicates with a corresponding cavity and separately contains and delivers a predetermined volume of greater than 50% of the total article weight of the first material during the first shot to a corresponding cavity;

the second fluid delivery channel fluidly communicating with a common source of injection of the second material, the common source of injection exerting a pressure that simultaneously delivers a volume of up to 10% of the total article weight as the second shot of second material to all of the plurality cavities beginning subsequent to the start of the delivery of the first shot to each cavity.

The common source of injection of the second material may comprise an injection screw or a fluid chamber that commonly communicates with and delivers the second material simultaneously to each cavity.

At least one or the other of the second channel and each cavity may include a heating mechanism for independent control of the temperature of the second material flowing into or through each cavity.

Each cavity may fluidly communicate with a separate corresponding nozzle, each nozzle having first and second bores respectively communicating with the first and second channels for delivering the first and second shots respectively and sequentially to a corresponding cavity.

Each of the separate fluid injection chambers may include a first drive mechanism, the common source of injection of the second material may include a second drive mechanism, and the apparatus may include a controller that times and directs the operation of the first and second drive mechanisms to effect initiation of delivery of the second shot upon completion of delivery of the first shot to all cavities.

The method and apparatus of the present invention are useful in the manufacture of multilayer plastic articles, such as preforms for making bottles and other food packaging containers. The polymer materials typically include a structural material and a barrier (e.g., to inhibit the passage of gas, moisture, flavor, etc.) or other higher performance (e.g., higher thermal resistance for hot-fillable, refillable or pasturerizable containers) material, or a lower cost material (e.g., recycled post-consumer articles and/or plant scrap). For example, a structural and/or thermal resistant material may be injected as the first shot, and the barrier and/or recycled material injected as the second shot. As a third shot, a structural, barrier and/or recycled material may be used.

Other combinations of polymer materials in the various layers are possible and included in the present invention. For example, a relatively less expensive polymer may be used as the larger volume layers, combined with a relatively more expensive polymer as the smaller volume layers (second shot). Any one or more layers may provide enhanced structural or other functional properties (e.g., thermal resistance, delamination resistance, etc.). Also, as used herein, first, second and third polymers is not limited to different polymers, and polymers is used broadly to include copolymers, mixtures, blends, etc.

These and other features of various embodiments of the invention may be better understood by referring to the following description in conjunction with the accompanying drawings.

BRIEF DESCRIPTION OF THE DRAWINGS

FIGS. 4A-4D are schematic side, cross-sectional views of a single mold cavity showing the progress of travel of polymer material flow into the cavity as a result of first, second, and third shots of polymer materials that are sequentially injected to form a five-layer article;

FIGS. 8A-8D are schematic side, cross-sectional views of a single mold cavity showing the progress of travel of polymer material flow into the cavity as a result of first, second, and third shots of polymer materials that are injected to form a three layer article, in accordance with another embodiment of the invention.

DETAILED DESCRIPTION

Figure 1:
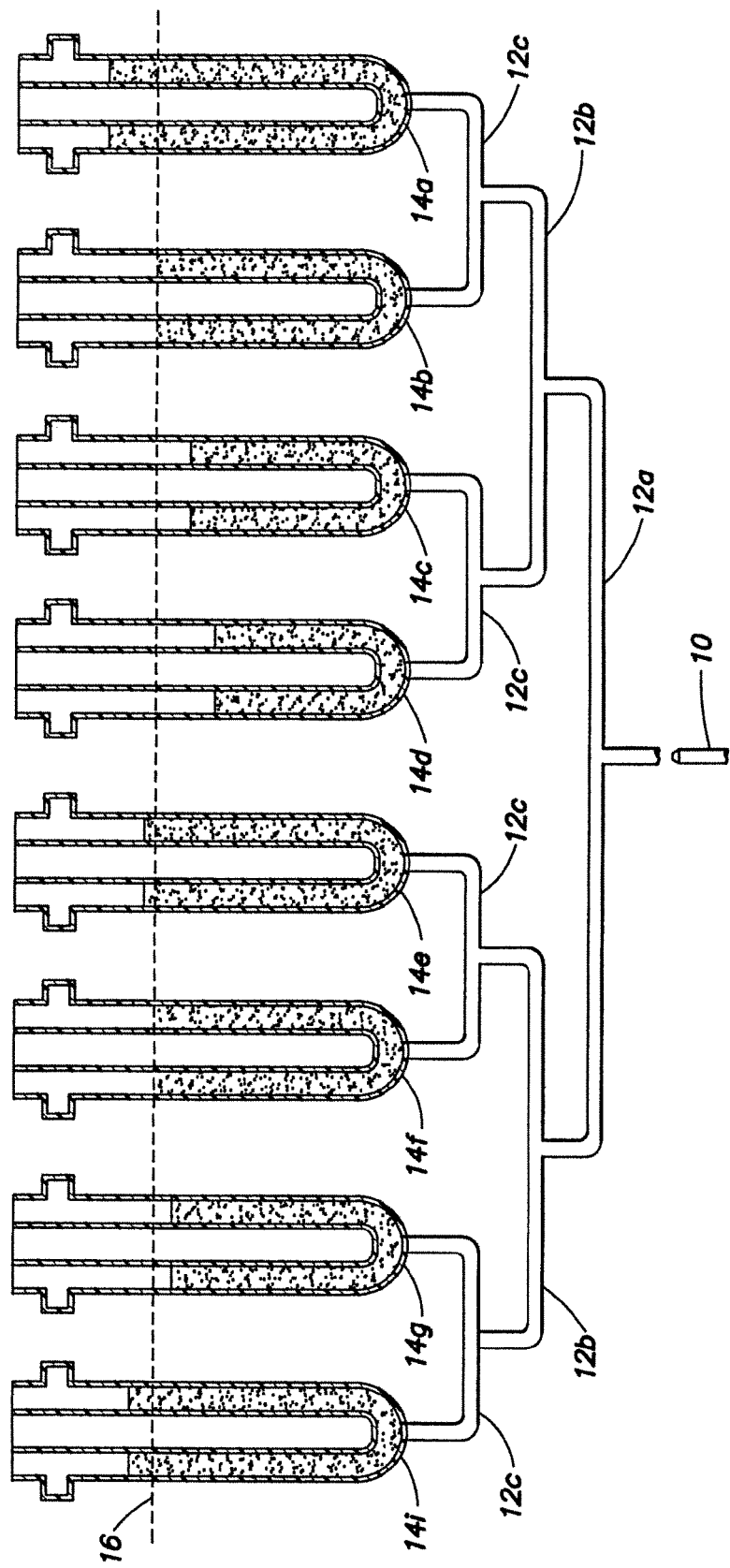
FIG. 1 is a schematic view of a multi-cavity mold system where each mold cavity fluidly communicates via a hotrunner channel system with a common source of pressurized fluid material, each mold cavity filling at a different rate during a single injection cycle.

FIG. 1 shows schematically an injection molding system having a multiplicity of essentially identically shaped cavities 14a-14i that are fed by a single source of polymer material 10. The system shown in FIG. 1 does not include shooting or metering pots to assist in controlling the amount or pressure of material flow to each cavity, but rather uses only the single source 10 of injection that provides all of the pressure by which the injected polymer material is forced to flow through all of the various and different manifold channels 12a-12c and into all of the multiple number of cavities 14a-14i. As shown, the forward most progress of travel of polymer material into each cavity 14a-14i is different for each cavity, the top or leading edge level of polymer material within each cavity varying in distance either above or below travel line 16 as shown in FIG. 1. These differences in rate and volume of material filling of identically shaped cavities typically arise out of minor differences in the size, shape, length and temperature of the path of channel travel from the source 10 through the channels 12a-12c to the separate cavities, as well as minor differences in the cavities 14a-14i themselves. Such differences in flow rate can be caused by very small differences between channel paths or cavities (e.g. tenths of millimeters in length or diameter or fractions of a degree in temperature) but such differences still result in the differences in fill rate among different cavities as shown in FIG. 1. Even small differences in fill rate can have a significant effect on the structure of the molded articles, e.g. the location of an interior barrier layer in a multilayer preform.

It has been found that injecting a relatively large amount of the first layer material in a precisely desired (i.e., metered) amount to each one of a multitude of mold cavities is important to achieving a proper layering within the cavities of a second relatively small amount of a second injected material. Methods and apparati for carrying out sequential first, second and third shots of materials arise in a variety of contexts pertinent to the present invention and are described by way of the following examples.

Figure 2A:
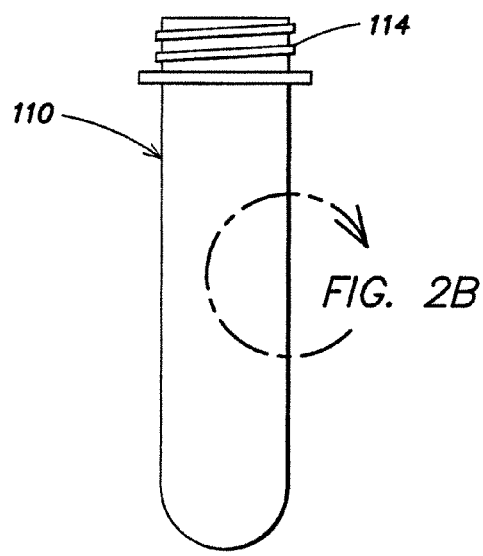
FIG. 2A is a schematic side, cross-sectional view of a five-layer preform
Figure 2B:
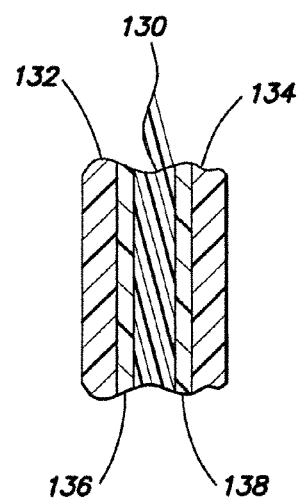
FIG. 2B is an enlarged fragmentary sectional view of a portion of the multilayer wall of the preform.
Figure 3A:
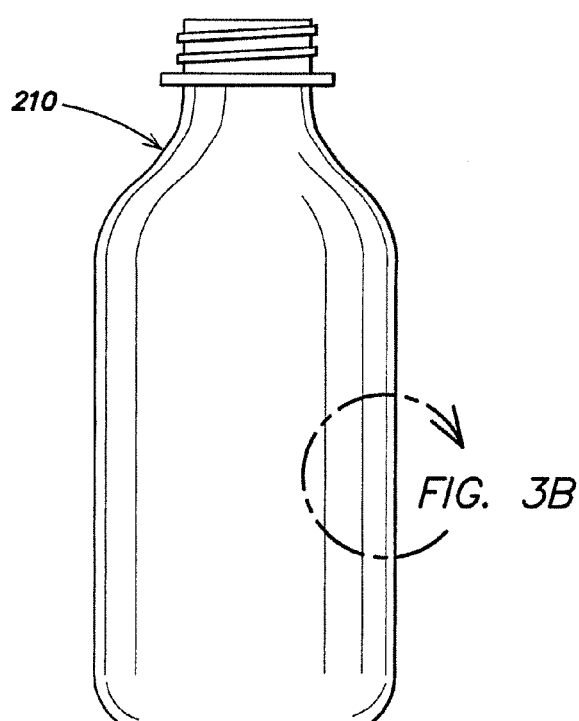
FIG. 3A is a schematic side, cross-sectional view of a blown bottle made from the five-layer preform of FIG. 2A.
Figure 3B:
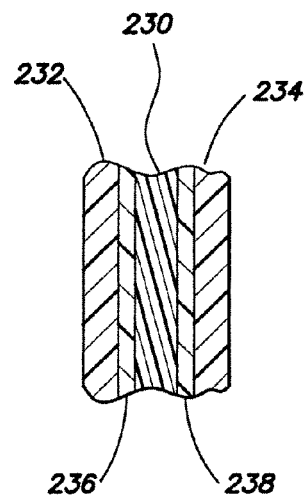
FIG. 3B is an enlarged fragmentary sectional view showing more specifically the multilayer wall of the bottle.

A typical embodiment of a three-material (3M), five-layer (5L) molded article is illustrated in FIGS. 2A-2B (preform) and FIGS. 3A-3B (bottle). A multilayer preform 110 manufactured by an injection molding process is shown in FIG. 2A. The multilayer preform 110 has a central interior core layer 130, two intermediate interior layers 136 and 138 on opposite sides of the core layer, and exterior inner 132 and outer 134 layers. The bottle 210 shown in FIG. 3A is made from the preform 110 by a blow molding process. Similar to the preform, the wall of the bottle has a central interior core layer 230, two intermediate interior layers 236, 238 and exterior inner and outer layers 232, 234. In a typical embodiment of a multilayer preform and/or bottle, the core 230 and exterior layers, 232, 234 of the bottle (FIG. 3B) and/or the core 130 and exterior layers 132, 134 of the preform (FIG. 2B), are comprised of a structural polymer; the structural polymer of the core layer may differ from that of the exterior layers. The relatively thin (low volume) intermediate layers of the bottle (236 and 238) and the preform (136 and 138), are typically comprised of another more expensive polymer, such as a barrier or other high performance polymer. Typical examples of multilayered preforms, bottles and packages and the specific compositions of the various layers of such multilayer objects are disclosed in U.S. Pat. Nos. 4,781,954; 4,863,046; 5,599,496 and 6,090,460, the disclosures of all of the foregoing of which are incorporated herein by reference in their entirety.

FIGS. 4A-4D illustrate a three-shot multilayer injection molding process for forming the five-layer, three-material preform of FIGS. 2A-2B. The preform is formed in a mold cavity 466 between an outer mold 303 and inner core 302 of a conventional injection mold. A first shot of first polymer material 318 is injected into a proximal end (gate) of a mold cavity 466 and as it flows through the mold cavity, due to the relatively cool temperatures of the outer mold 303 and inner core 302, there will be solidification of the first polymer material on both the inner and outer walls of the mold cavity/core to define exterior inner 304 and outer 306 preform layers (layers 132 and 134 in FIG. 2B) of the first material. In FIG. 4A, the relatively large volume of first shot material has progressed part way (roughly half way) up the mold cavity walls. In FIG. 4B, a second shot of a second polymer material 320, e.g., a barrier material, is injected into the bottom of the mold cavity. The relatively small amount of barrier material 320 may pool at the lower end of the cavity. A relatively large third shot 322 of a third polymer material is then injected into the gate at a pressure which causes the second shot material 320 to be pushed up the mold cavity to form inner and outer intermediate preform layers 309, 310 (layers 136 and 138 in FIG. 2B), while the third material 322 forms a central core preform layer 328 (layer 130 in FIG. 2B). The tunnel flow of the second 320 and third 322 shots, between the exterior layers 304 and 306, enables the formation of relatively uniform and thin interior intermediate layers 309 and 310 of the barrier material 320, and a thicker core layer of material 322. Finally, the advancing layers reach the distal end of the mold cavity, producing the five-layer preform structure having interior intermediate and core layers extending up into the neck finish (as shown in FIG. 4D). Alternatively, the interior layers 309, 310 and 328 may extend only partially up the preform wall and terminate, for example, below the preform neck finish 114 (FIG. 1). Still further, a fourth shot (of for example the first material 318) may be injected after the third shot in order to clean the nozzle of the third shot material 322 and/or form a further interior layer in some or all of the preform base (not shown), thus fully sealing the second and third shot materials from outside exposure. As used herein, the intermediate 309, 310 and core 328 layers are considered "interior" layers whether or not a minor portion at the base is exposed. The above-described process is given by way of example only, and is not meant to be limiting; many other processes may be used to form multilayer articles, including articles other than preforms.

Figure 5:
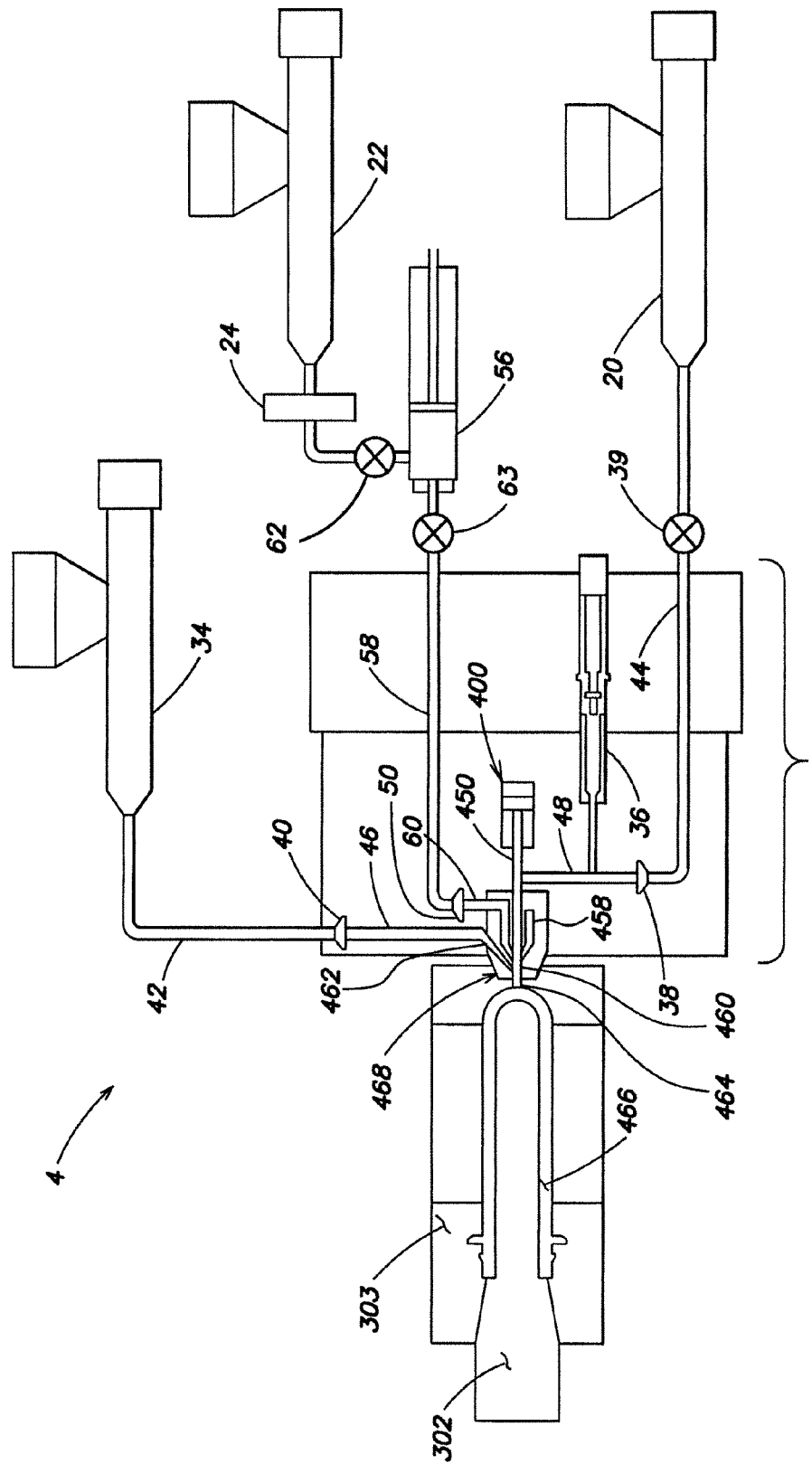
FIG. 5 is a schematic view of a multi-cavity injection molding system, according to one embodiment of the present invention (showing only a single cavity for ease of discussion), where three different materials are controllably injected into each cavity.

FIG. 5 shows one embodiment of an injection molding system 4 according to the invention. This embodiment is capable of carrying out a 3-shot, 5-layer process as described with reference to FIGS. 4A-4D. The system 4 includes an inner core 302 and outer mold 303 cavity set, an associated nozzle 468 and actuator 400, a manifold 18, and three separate sources 20, 22, 34 of first, second and third polymer materials. For purposes of discussion, only one mold cavity 466 is shown in FIG. 5.

Figure 6:
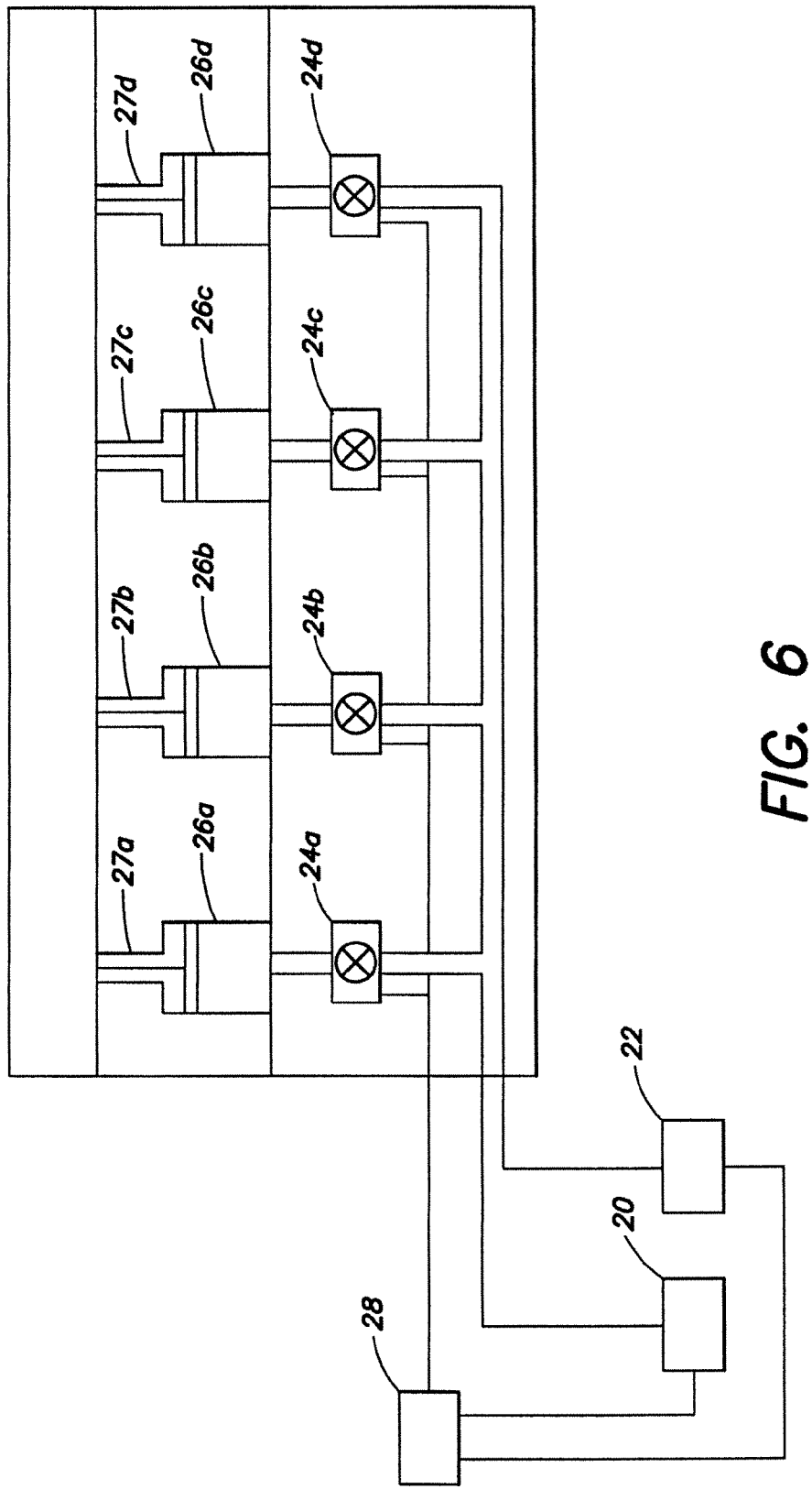
FIG. 6 is a schematic view of a multi-cavity injection molding system where the timing of the delivery of material to each cavity is controlled via a controller.

A first source (e.g, screw/barrel) 20 supplies the first shot material through a common feed manifold channel 44. Each separate cavity is separately provided with a metering (a/k/a shooting) pot 36 to ensure that a precisely metered amount of the first shot of structural material is injected into the associated cavity via a separate channel portion 48 that specifically communicates with an individual cavity 466. In FIG. 5, metering pot 36 feeds channel portion 48 that feeds cavity 466, it being understood that a separate metering pot and associated separate channel portion is separately provided for each one of the multiplicity of cavities (not shown in FIG. 5) in a multi-cavity system. The common channel feed portion 44 communicates with all of the cavities and with each individual channel portion 48 via valve 38. Valve 38 is closed at the start of the first shot in order to separate and close channel portion 48 and metering pot 36 off from communication with the rest of the system, such that metering pot 36 can separately control the fluid material pressure in the cavity 466 and its associated nozzle channel. In the present embodiment, the nozzle 468 has a central axial bore 460 and two side bores 458 and 462 (shown in greater detail in FIGS. 7A-7C). An actuator assembly 400 moves a valve pin 450 within central bore 460 to control the opening and closing of all of the nozzle bores 458, 460, 462 according to a predetermined program. The nozzle actuator 400 (shown only schematically in FIG. 5) can be a single piston/chamber actuator (as shown in the specific embodiment of FIGS. 7A-7C), a multiple piston/chamber, or any other known actuator design suitable for use in injection molding valve pin applications. A controller, described below with reference to FIG. 6, is provided to control valves 38, 39, 40, 50, 62, 63 to control flow through selected bores of the nozzle 468.

Unlike the first shot, the second shot material, e.g. a gas barrier (passive or active) material, is commonly fed to the multiplicity of cavities from a common single second source (e.g., screw/barrel) 34 via a common manifold channel 42. As described with reference to the first shot, each separate cavity is provided with a separate channel portion 46 that feeds cavity 466. As shown, the common channel feed portion 42 communicates with individual channel portion 46 by valve 40 which is typically closed during the course of the first shot and up until the start of the second shot. Valve 40 separates and closes channel portion 46 off from communication with the rest of the system. Feed channel 46 communicates with an axially offset feed bore 462, within the body of nozzle 468, to feed the gate 464 (see FIGS. 7A-7C). When valve 40 is opened at the conclusion of the first shot, either screw/barrel 34, or a machine (master) shooting pot that is common to all cavities (not shown), provides all of the pressure necessary for delivery of the second shot of material to all of the cavities in the multicavity system. The second shot of material can be delivered in such a relatively imprecise manner (e.g., ±20% of the desired weight of the second shot layer in the article) because the first shot of material (see FIG. 4B) has been previously delivered in a precisely metered volume. In certain applications, a greater amount of the second shot barrier material may be provided so that all cavities receive at least a minimum volume of the barrier material (e.g., to insure a predetermined minimum barrier height is met in each cavity/preform). In many applications, the second shot of the second material is preferably not commenced to any one of the multiplicity of cavities until the first shot of the first material has been completely delivered to all of the cavities. However in other applications, the second shot may be started after the first shot begins but before it is finished, so that there is some amount of simultaneous delivery of the first and second (and third) shots. As used herein, sequential means one shot starts after a prior shot, but some overlap in the delivery is not precluded.

The metering pots 36 for feeding the first shot to the individual cavities are typically arranged and adapted to be mounted on the hotrunner or manifold 18 portion of the system 4 such that the individual metering pots can be readily interconnected for fluid communication with each individual manifold channel portion 48 that separately communicates with an individual cavity. By contrast, a master metering pot (such as metering pot 56 for the third shot as described below), can be mounted and provided on the injection mold machine itself (as opposed to the manifold 18) for purposes of acting as a common source of stored and ready material for simultaneous and common feed to all of the multiplicity of cavities.

In the embodiment shown in FIG. 5, a machine metering pot 56 is fluidly connected to the third source (screw/barrel) 22 for injecting a third shot material (see FIGS. 4C-4D). The third shot is delivered to the same gate 464 through a third bore 458 in nozzle 468 that terminates at and communicates with the same gate 464 as nozzles bores 460, 462. Prior to the start of the third shot, the machine metering pot 56 is filled and the valve 62 closed. The valve 63 is opened at the start of the third shot to all cavities. The common manifold channel portion 58 communicates with and allows simultaneous injection of the third shot to all of the multiplicity of cavities. One of the primary purposes of the use of the machine metering pot 56 is to ensure that an excess of fluid material is always present in the system between the screw/barrel 22 and the cavities 466 to be ready for injection from one injection cycle to the next. The machine metering pot 56 is a common source of material feed and provides all of the pressure necessary to deliver the third shot of the third material to all of the multiplicity of cavities.

As described above, a similar machine metering pot could be employed in connection with carrying out the second shot.

As shown schematically in FIG. 6, delivery of material to each separate cavity of a multi-cavity system can be mechanically controlled with valve pins 27a-d that are reciprocally movable via fluid driven actuators 26a-d. The actuators are driven by fluid that is controllably input and output to the actuators' cylinders via fluid pumps 20, 22 and/or valves 24a-d. Timed control over the drive of the pumps 20, 22 and/or the opening/closing of valves 24a-d can be carried out by use of a controller 28 according to a predetermined program loaded in the processor and/or memory of controller 28. Controller 28 typically comprises a microprocessor or other digital data processing/storage apparatus.

Figure 7A:
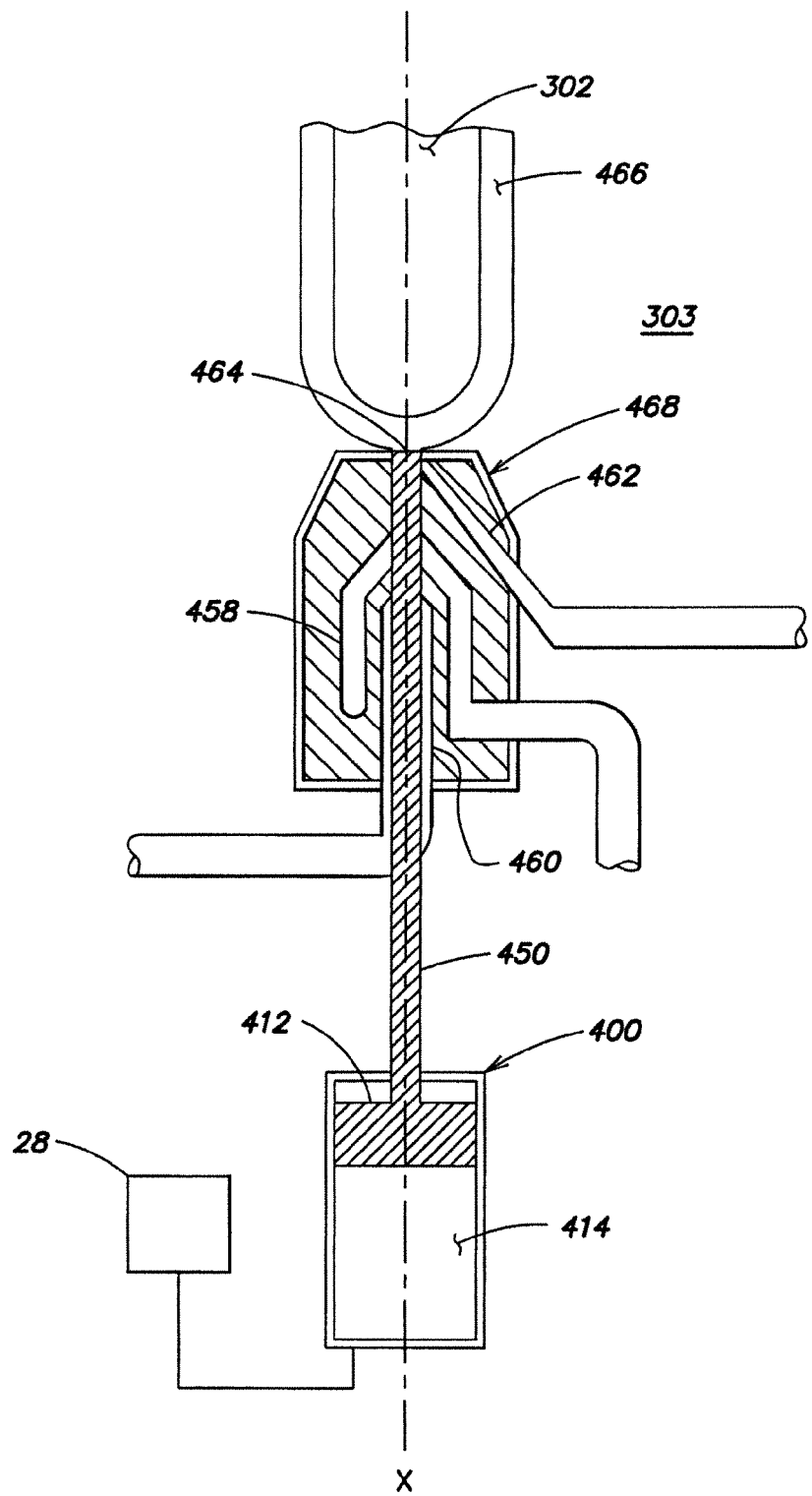
FIGS. 7A-7D are schematic side, cross-sectional views of a multi-position actuator/valve pin and associated multi-bore nozzle usable in select embodiments of the invention.
Figure 7B:
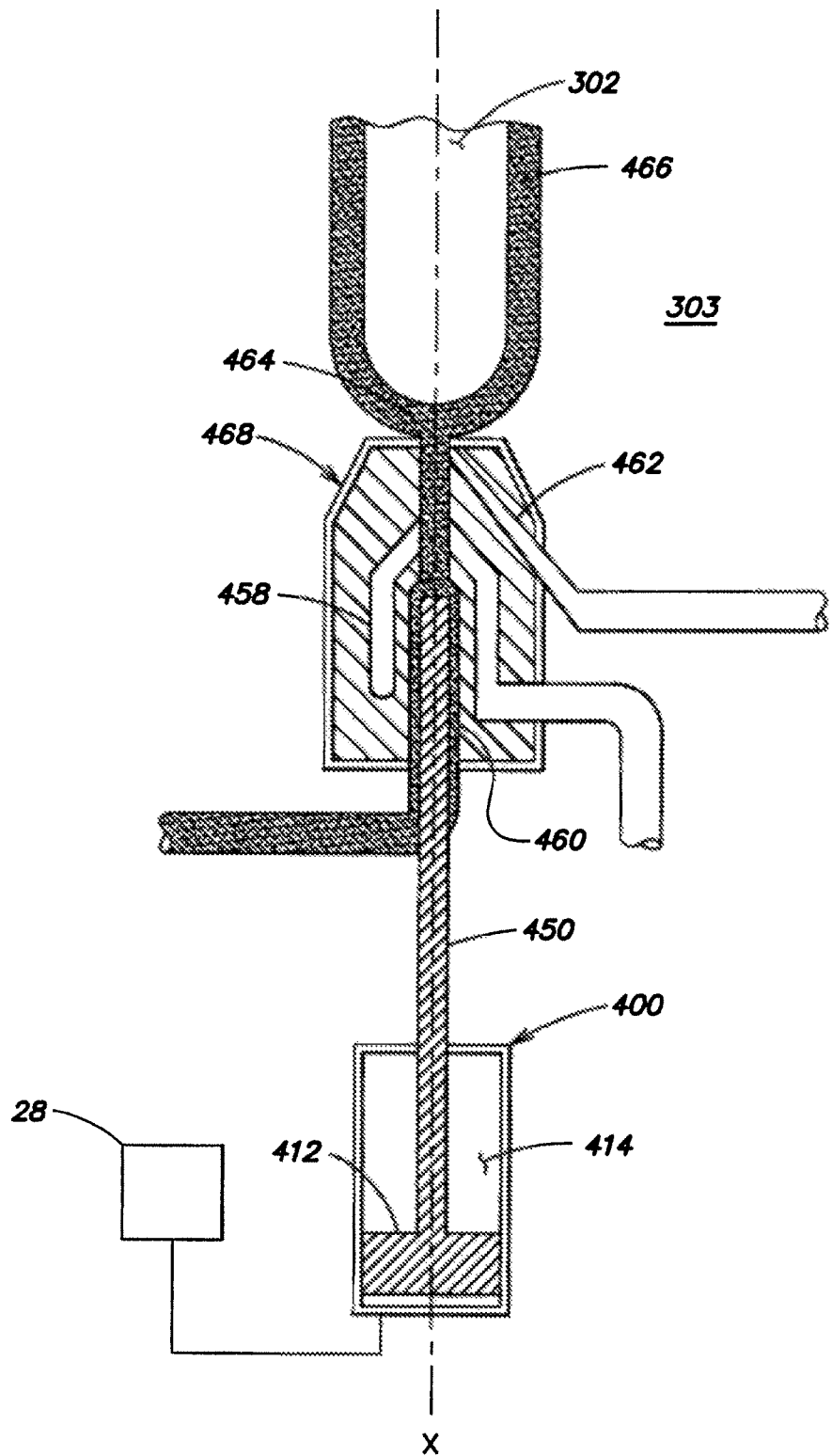
Figure 7C:
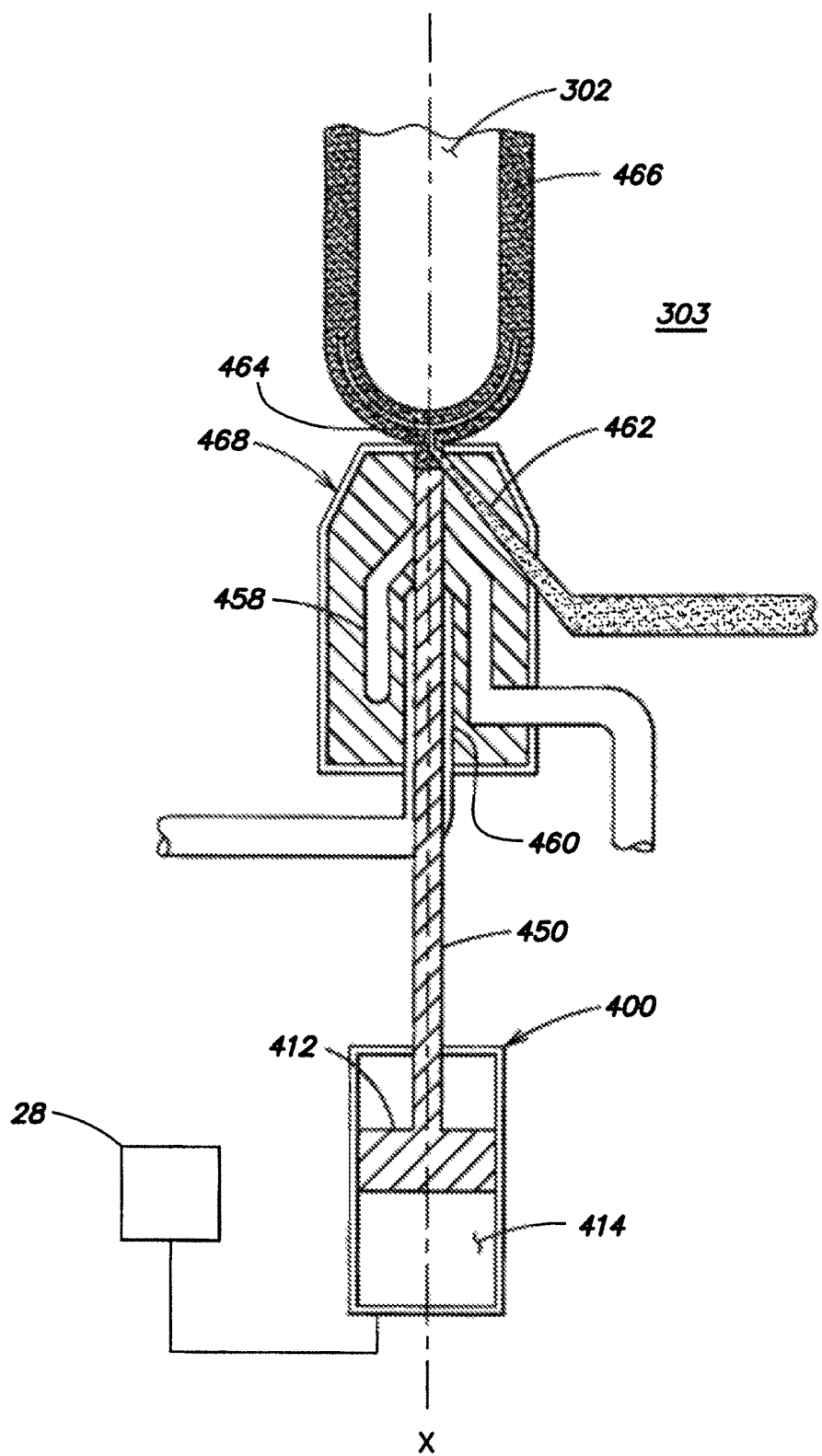

FIGS. 7A-7C show one embodiment of a nozzle design and process for delivering selected amounts of three materials in three successive shots to a cavity at predetermined times during the course of a single injection cycle. As shown, the actuator system 400 comprises an actuator having a single piston 412 sealably mounted within a chamber 414 for reciprocal fluid-driven (hydraulic or pneumatic) movement of the piston 412 and any associated/attached parts, such as valve pin 450, along axis X. In the manner described with reference to FIG. 6, controller 28 directs the drive of the actuator piston 412 according to a program that precisely times the operation and movement of the valve pin 450 between the multiple positions shown in FIGS. 7A-7C in synchronization with the operation of the drive mechanisms for the metering pot 36, the screws 20, 22, 34, the valves 38, 39, 40, 50, 62, 63 and any associated operational components of the system. In multi-cavity applications, the controller 28 is typically interconnected to and simultaneously directs the drive of all of the multiplicity of actuators, valves, screws, metering pots and the like during a single injection cycle.

In one embodiment, FIG. 7A shows a start position of the actuator 400 and the valve pin 450 in a typical three material shot injection cycle. In FIG. 7A, all three material flow channels 458, 460 and 462 are closed at the beginning of a cycle such that there is no flow of any of the three materials into or through the gate passage 464 to the cavity 466.

As described with reference to FIG. 5, the first shot of virgin material is delivered from the metering pot 36 through a central axial bore 460 in the nozzle 468. At the start of the first shot, the controller 28 instructs the actuator 400 to retract the valve pin 450 to the position shown in FIG. 7B where the tip end of the central bore 460 is opened and material flow through central bore 460 into gate 464 of cavity 466 is enabled. Once the first shot is underway, cavity 466 begins to fill in the manner and profile shown schematically in FIG. 4A.

To begin the second shot, the controller instructs the actuator 400 to move the pin 450 to the position shown in FIG. 7C to close the central axial bore 460 (feeding the first shot material) and enable flow of the second material through nozzle bore 462. Simultaneously the controller 28 instructs either valve 40 to open or screw 34 to operate (or both) in order to coordinate the start of the flow of the second material with the opening of nozzle bore 462. Once the injection flow of the second shot is underway, the second material flows through each individual manifold channel portion 46, each second nozzle bore 462 and each individual gate 464 into each individual cavity 466 to achieve the second shot fill profile shown in FIG. 4B. As described herein, the use of an individual metering pot for use in delivering the second shot is eliminated.

Figure 7D:
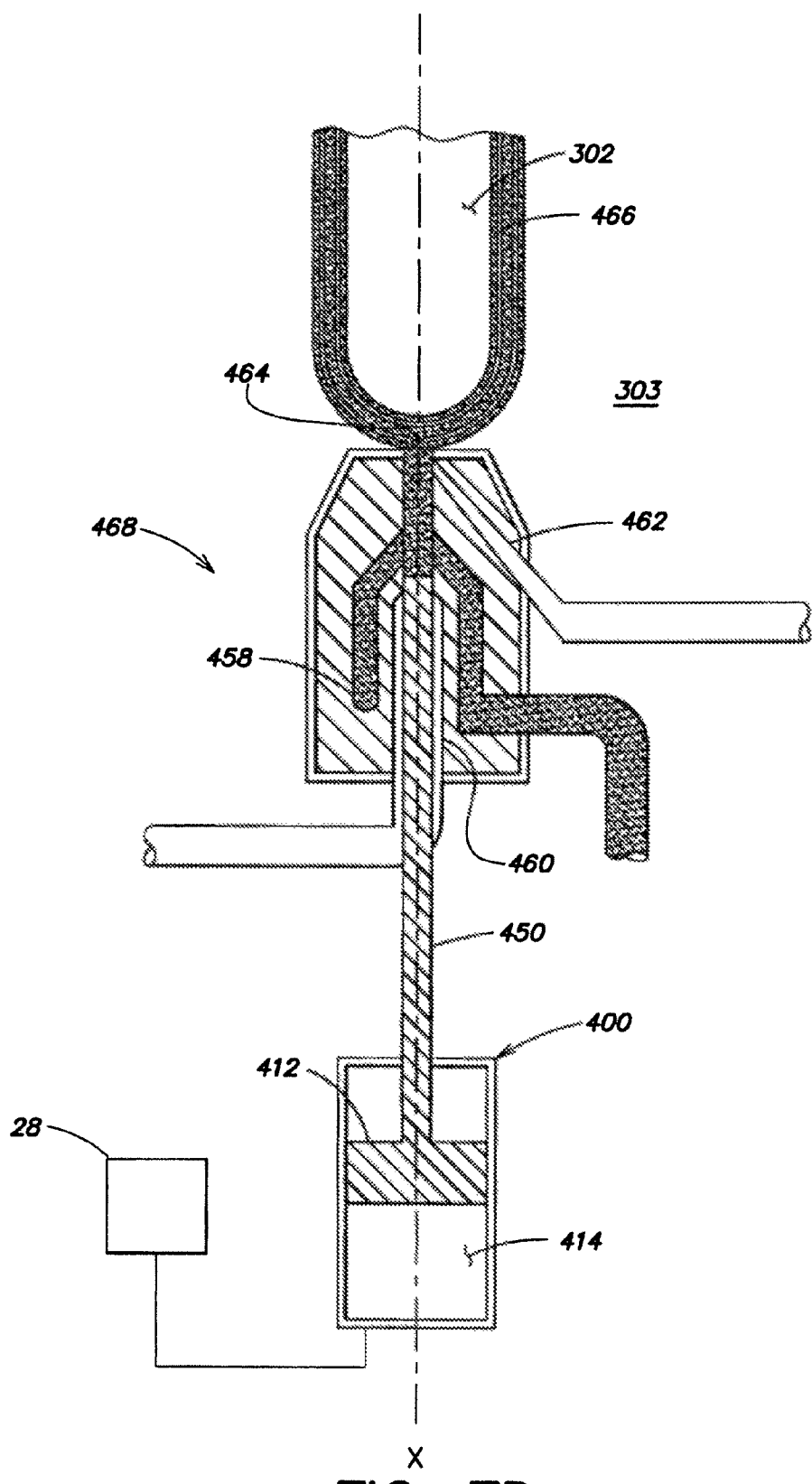

In the embodiment illustrated in FIG. 5 where a third shot of a third material is delivered simultaneously to all cavities via a common manifold channel 58, the third shot is preferably commenced upon completion of the second shot to all cavities. The third shot is commenced (either simultaneously to all cavities or at separate times) by moving the valve pin 450 and associated actuator 400 back to a position as shown in FIG. 7D, where at least the tip end of the third material bore 458 is open to communication with gate 464 and cavity 466, allowing the third shot polymer material to push up in the second shot material in the mold and form a five layer preform. Controller 28 simultaneously directs the movement of the pin 450, actuator 400, valves 62, 63 and metering pot 56 to precisely begin and end the flow of the third shot. At the conclusion of the third shot, the valve pin 450 is directed to move back to the FIG. 7A closed position.

Figure 8C:
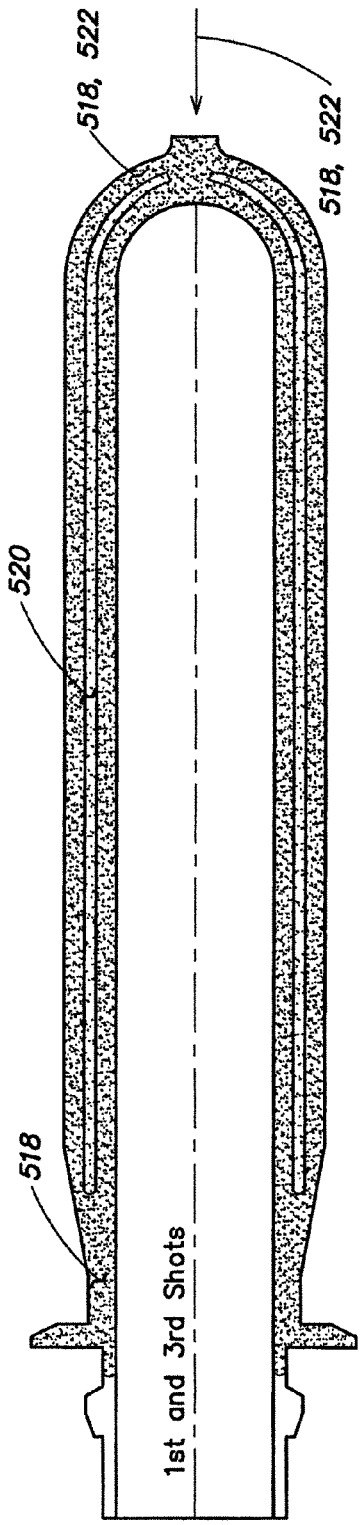
Figure 8D:
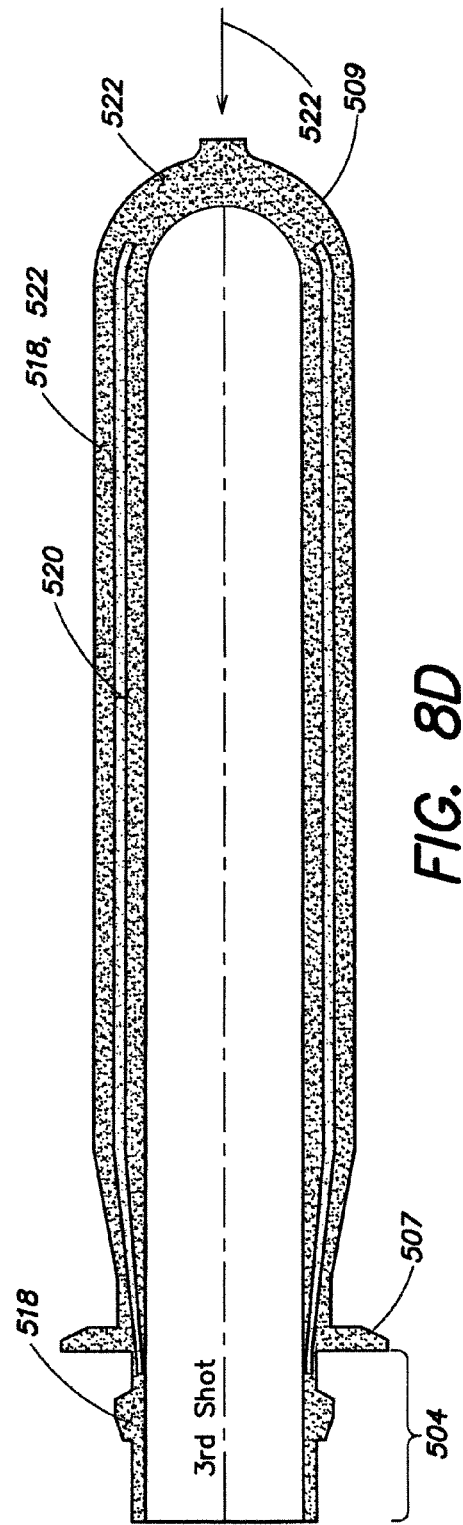
Figure 9:
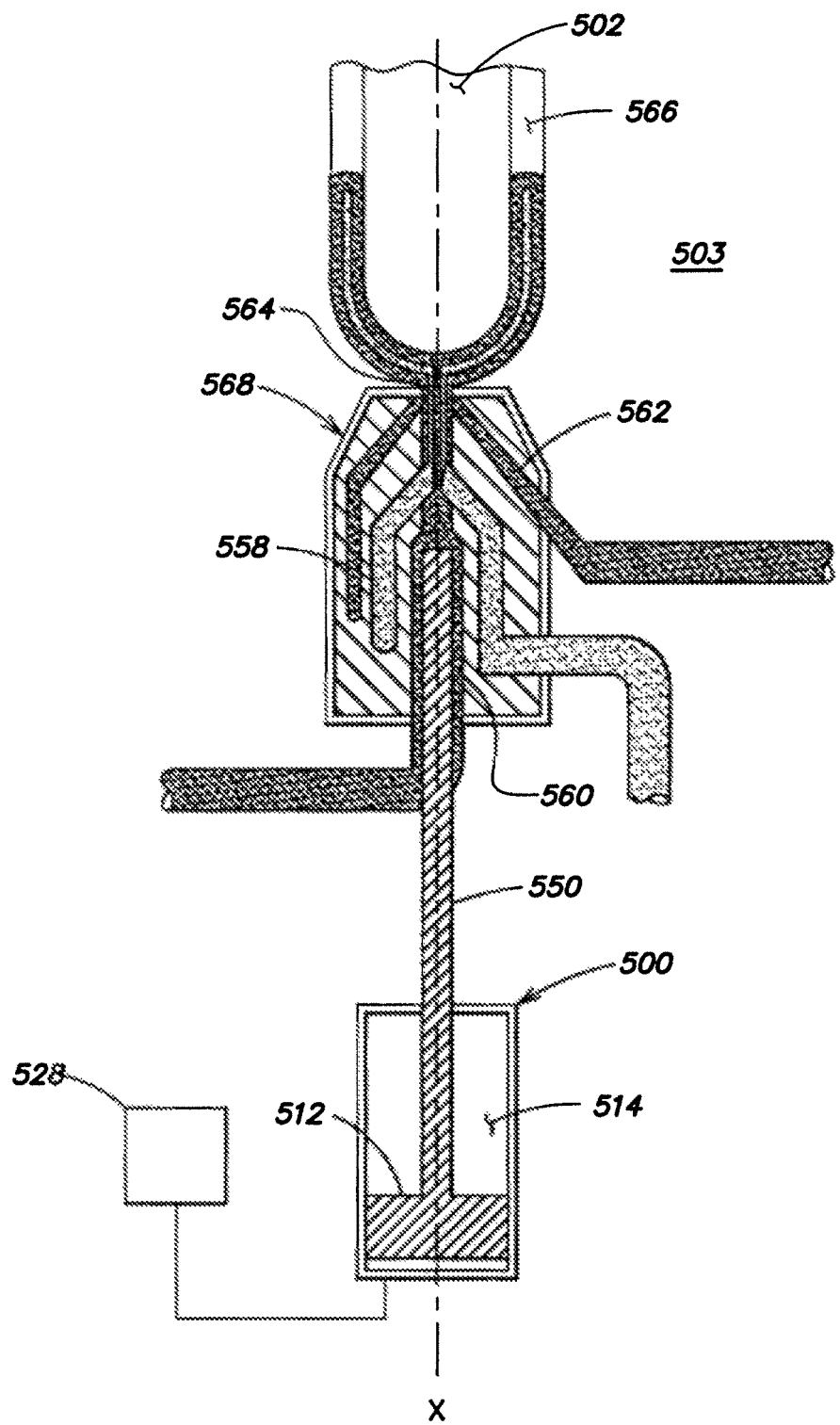
FIG. 9 is a schematic side, cross-sectional view of an actuator/valve pin and associated multi-bore nozzle usable in the embodiment of the FIG. 8.

FIGS. 8-9 illustrate another embodiment of a method and apparatus according to the invention for making a three layer preform. FIGS. 8A-8B show a sequence of steps of filling a mold with multiple polymer materials to form the three layer article, and FIG. 9 shows an associated valve apparatus for supplying the multiple polymer materials to the mold cavity.

FIG. 8A shows a first shot of a structural polymer material 518, such as PET, being injected into the gate end of the mold between a core 502 and outer cavity 503. At this point in time, about 80-95% of the total first shot volume has been injected into the mold cavity; the total first shot weight of PET is approximately 75-85% of the total preform weight. FIG. 9 shows a suitable nozzle 568, a valve pin 550 and an actuator assembly 500 including piston 512, chamber 514, and controller 528. The nozzle 568 has a bore 562 through which the first shot of PET material is introduced through gate 564 into the mold cavity 556.

FIG. 8B shows a next point in the sequence in which first, second and third shots 518, 520, 522 respectively are being simultaneously injected through gate 564 into cavity 566. The second shot of barrier polymer material 520 is commenced while the first shot 518 continues to enter and fill the mold. In addition, a third shot 522 of structural polymer material, here the same PET as the first shot material, is begun with the start of the second shot barrier material. As shown in FIG. 9, the second shot barrier material is supplied by bore 558 and the third shot PET material is supplied by bore nozzle 560, at the same time that bore 562 supplies the first shot PET material. In this embodiment, the relative positioning of the first, second and third shot bores differs from that in the previous embodiment, and thus the feed sources of FIG. 5 would be accordingly modified in a known manner (e.g., an individual shooting pot for feeding the first shot bore 562, a common source for feeding the second shot bore 558, and another source for feeding the third shot bore 560).

FIG. 8C shows a next point in the sequence in which the second barrier shot 520 has ended, but the first 518 and third 522 shots continue. As shown, the first shot 518 is almost completely in (approaching the neck finish 504 end of the preform) and the third shot 522 is still filling (along with completion of the first shot).

FIG. 8D shows a next point in the sequence in which the first and second shots have now ended, and the third shot 522 continues to be supplied to the gate for a pack and hold stage as the preform cools and shrinks. The resulting three layer structure, which extends from within the preform finish 504 (just above the flange 507) down to the top of the preform end cap 509, includes a central core layer 520 of the barrier material disposed between inner and outer exterior layers of PET (formed by the first and third shots 518 and 522). The positioning of the layers, the weight percentage of materials, and/or the composition of the materials may all be varied in accordance with the desired application.

There has thus been shown various method and apparatus embodiments of the invention for producing multilayer articles such as preforms. These and other implementations and modifications thereof will be readily apparent to the skilled person and is included within the scope of the invention as described in the following claims.

The invention claimed is:

1. An injection molding apparatus for sequential delivery of multiple shots of polymer material to a plurality of mold cavities to form multilayer articles, the apparatus comprising:
a plurality of mold cavities, each mold cavity fluidly communicating with a first, a second and a third fluid delivery channel configured to respectively deliver first, second and third shots of polymer materials sequentially to each mold cavity;
the first fluid delivery channel having separate channel portions each individually fluidly communicating with a corresponding mold cavity, wherein each channel portion has a separate fluid injection chamber that separately communicates with a corresponding mold cavity, each chamber configured to be pre-filled with a predetermined volume of a first polymer material of greater than 50% of a total weight of each multilayer article wherein each chamber simultaneously delivers the predetermined volume of the first polymer-material during the first shot to each mold cavity;
the second fluid delivery channel fluidly communicating with a common source of injection of a second material, the common source of injection configured to exert a pressure that simultaneously delivers to each of the plurality of mold cavities up to 10% of the total weight of the multilayer article as the second shot of the second material, wherein a delivery of the second shot by the common source to all of the plurality of mold cavities begins subsequent to a start of a delivery of the first shot to each mold cavity;
the third fluid delivery channel fluidly communicating with each of the plurality of mold cavities for delivering the third shot of a third material to each of the mold cavities.

2. The apparatus of claim 1, wherein the common source of injection of the second material comprises an injection screw or a fluid chamber that commonly communicates with and delivers the second material simultaneously to each mold cavity.

3. The apparatus of claim 1, wherein at least one of the second fluid delivery channel and the corresponding mold cavity includes a heating mechanism for independent control of a temperature of the second material flowing into or through each mold cavity.

4. The apparatus of claim 1, wherein each mold cavity fluidly communicates with a separate corresponding nozzle, each nozzle having first and second bores respectively communicating with the first and second channels for delivering the first and second shots respectively and sequentially to a corresponding mold cavity.

5. The apparatus of claim 1, wherein each of the separate fluid injection chambers include a first drive mechanism, the common source of injection of the second material includes a second drive mechanism, and the apparatus includes a controller that directs the operation of the first and second drive mechanisms to effect initiation of delivery of the second shot upon completion of delivery of the first shot to all of the plurality of mold cavities.

6. The apparatus of claim 1, wherein the third fluid delivery channel includes a manifold channel for injecting the third shot under pressure by a common source of the material to all of the plurality of mold cavities.

7. The apparatus of claim 1, wherein the first material is a structural polymer material.

8. The apparatus of claim 7, wherein the second material is a barrier polymer material.

9. The apparatus of claim 8, wherein the third material of the third shot is at least one of a structural and recycled material.

10. The apparatus of claim 1, wherein the second fluid delivery channel delivers up to 8% of the total weight of each multilayer article as the second shot.

11. The apparatus of claim 1, wherein the second fluid delivery channel delivers up to 5% of the total weight of each multilayer article as the second shot.

12. The apparatus of claim 1, wherein the first and third shots of the polymer materials are the same structural polymer material.

13. The apparatus of claim 1, wherein each multi-layer article comprises a five layer preform having a sidewall and a closed base end, the first material being a structural polymer that forms exterior inner and outer layers in the sidewall and base end, the second material being a barrier polymer that forms interior inner and outer barrier layers in the sidewall and base end, and the third shot delivers the third material that advances the second material in the sidewall and base end to form a core layer between the interior barrier layers.

14. The apparatus of claim 1, including a nozzle at each mold cavity, wherein the first, second and third fluid delivery channels deliver the first, second and third shots of polymer materials to each mold cavity via the nozzle.

15. The apparatus of claim 14, wherein each nozzle includes a valve pin, and the apparatus further including an actuator for driving the valve pin in each nozzle.

16. The apparatus of claim 15, including a controller that controls drive of the actuator according to a program that times the operation and movement of the valve pins between multiple positions for delivering the first, second and third shots to each of the mold cavities.

* * * * *